(12) United States Patent
Kajita et al.

(10) Patent No.: US 7,660,044 B2
(45) Date of Patent: Feb. 9, 2010

(54) IMAGE DISPLAY APPARATUS AND IMAGE DISPLAY METHOD

(75) Inventors: Yoshiki Kajita, Kawasaki (JP);
Hiroyuki Nakanishi, Yokohama (JP);
Hiroichi Yamaguchi, Sagamihara (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 12/399,447

(22) Filed: Mar. 6, 2009

(65) Prior Publication Data

US 2009/0231721 A1 Sep. 17, 2009

(30) Foreign Application Priority Data

Mar. 14, 2008 (JP) .............................. 2008-066737

(51) Int. Cl.
*G02B 26/12* (2006.01)
*G02B 27/14* (2006.01)
*G06F 3/038* (2006.01)

(52) U.S. Cl. ........................ 359/630; 359/223; 359/900; 345/212; 345/214

(58) Field of Classification Search .............. 359/196.1, 359/223.1, 290, 618, 630, 900; 345/7, 9, 345/212, 214
See application file for complete search history.

(56) References Cited

U.S. PATENT DOCUMENTS

| 7,206,135 B2 | 4/2007 | Yamazaki | |
|---|---|---|---|
| 2008/0297868 A1* | 12/2008 | Mizumoto | ................... 359/199 |

FOREIGN PATENT DOCUMENTS

| JP | 09-230277 | 9/1997 |
|---|---|---|
| JP | 11-095144 | 4/1999 |
| JP | 2003-177347 | 6/2003 |
| JP | 2006-162780 | 6/2006 |

* cited by examiner

*Primary Examiner*—Jack Dinh
(74) *Attorney, Agent, or Firm*—Cowan, Liebowitz & Latman, P.C.

(57) ABSTRACT

An image display apparatus has light beam emitting units (304L, 304R) which emit light beams based on image information and a set operating frequency, and MEMS mirrors (305L, 305R) which deflect the emitted light beams by deflection operations based on the operating frequency, in correspondence with the right and left eyes. Resonance frequency detection units (306L, 306R) respectively detect the resonance frequencies of the MEMS mirrors (305L, 305R). A control unit (307) sets the operating frequency of the MEMS mirrors (305L, 305R) based on the detected resonance frequencies.

12 Claims, 15 Drawing Sheets

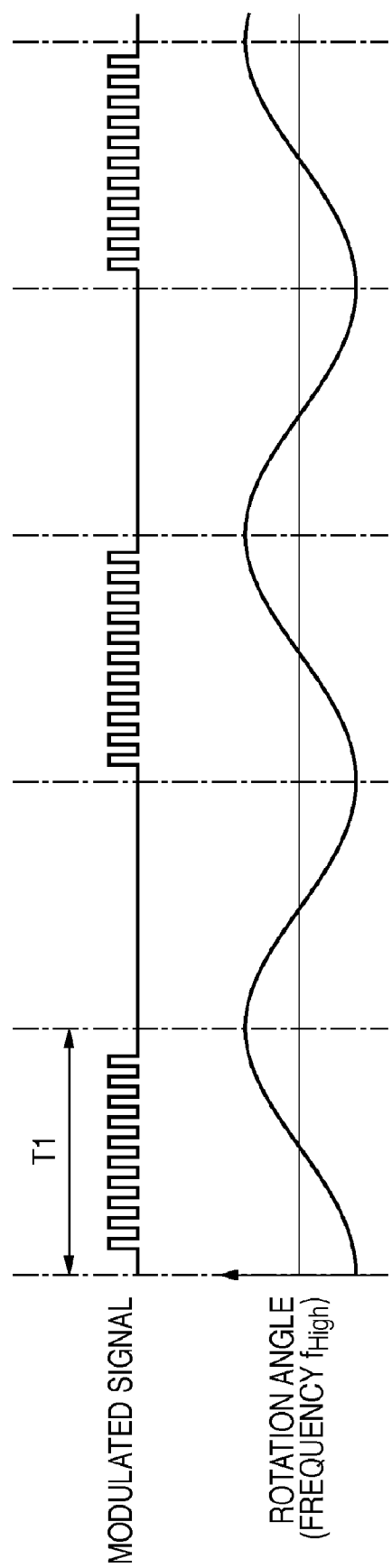

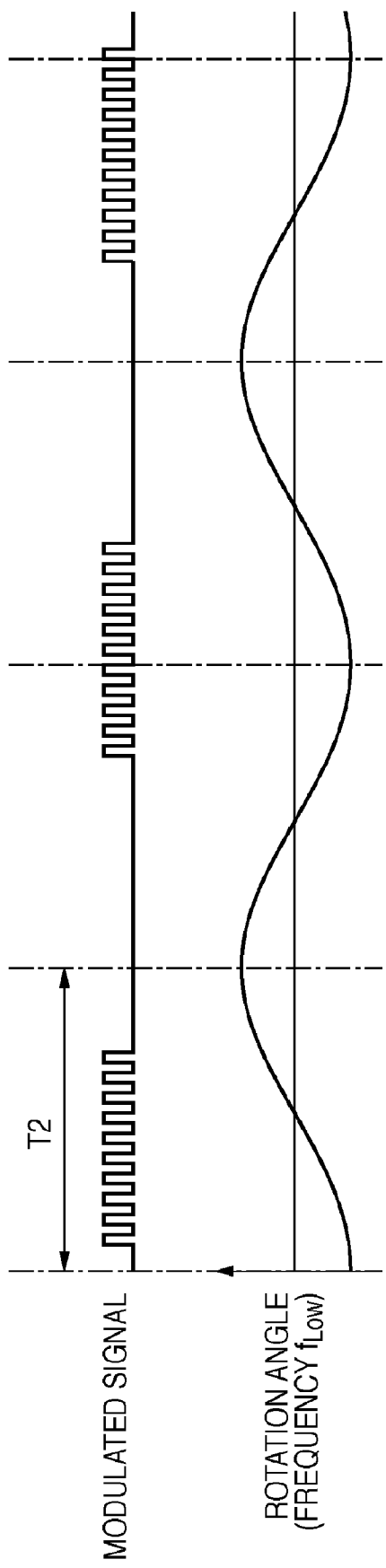

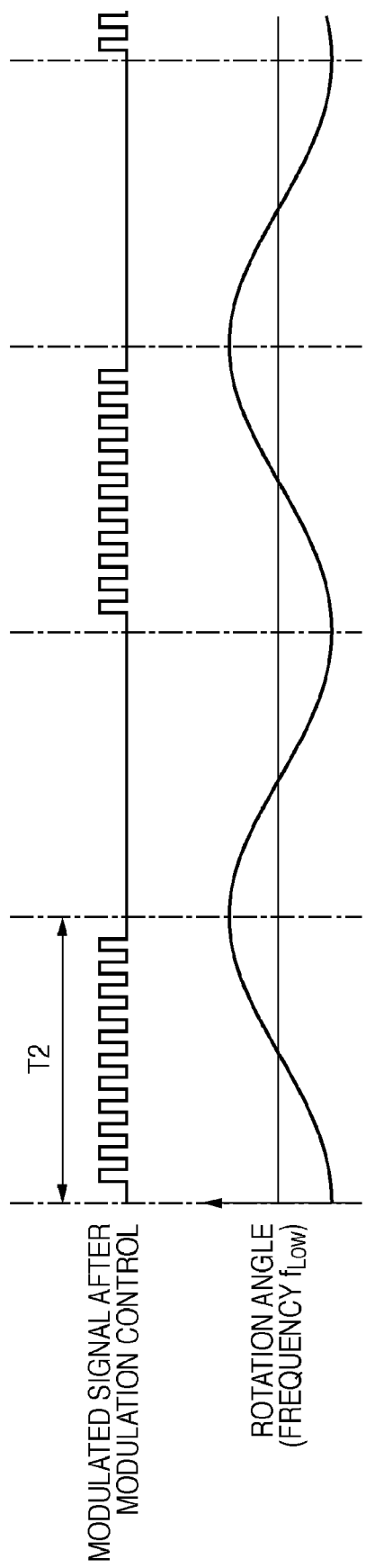

IMAGE DISPLAY APPARATUS AND IMAGE DISPLAY METHOD

BACKGROUND OF THE INVENTION

1. Field of the Invention

The present invention relates to an image display technique.

2. Description of the Related Art

Conventionally, some Head Mounted Displays or Hand Held Displays, which display a virtual image by guiding image light to the pupils of an observer, have been proposed. Of these displays, an image display apparatus which displays an image based on light rays reflected by an oscillating reflecting surface is disclosed in patent reference 1.

The image display apparatus disclosed in patent reference 1 includes one horizontal scanning unit (common to the right and left eyes) and two vertical scanning units. Light beams coming from two light sources for the right and left eyes are scanned by the horizontal and vertical scanning units via collimator lenses, and are guided to the eyeballs via optical systems.

An image display apparatus disclosed in patent reference 2 uses a two-dimensional scanning mirror, and attains an optical size reduction.

In case of a MEMS (Micro Electro Mechanical Systems) mirror which uses the resonance phenomenon of a silicon substrate, the Young's modulus of the silicon substrate changes due to a change in temperature, and the resonance characteristic (maximum resonance frequency) changes accordingly. For this reason, assuming that the driving frequency is constant (the frequency of an AC voltage to be applied is constant), the deflection angle of a micromirror varies due to a change in temperature, thus posing a problem. For example, even when the temperature of the micromirror has changed, the oscillating frequency does not change unless the frequency of an AC voltage to be applied is changed. However, as the temperature of the micromirror rises, the deflection angle of the micromirror becomes smaller. In this way, when the deflection angle of the micromirror varies, the scanning range of reflected light of a light beam irradiated toward the micromirror varies. Therefore, if there are a time period in which both light beams for the right and left eyes are emitted and a time period in which they are not emitted, the temperature of the MEMS mirror varies along with an elapse of time, and such temperature variation appears as an image distortion.

Techniques that solve the problems caused by the change in resonance frequency are disclosed in patent references 3 and 4.

An optical scanning apparatus disclosed in patent reference 3 is as follows. That is, based on the waveform of a back electromotive force generated in a coil equipped on one of a movable plate and main body depending on the oscillating state of the movable plate which is axially supported by the main body to be oscillatable, a sinusoidal exciting current to be supplied to the coil is stopped for a predetermined period. During this period, the resonance frequency is detected. After that, the movable plate is driven by the sinusoidal exciting current of the detected resonance frequency, thus controlling the movable plate to follow a change in resonance frequency, and stabilizing the amplitude.

An optical scanning apparatus disclosed in patent reference 4 measures the deflection frequency upon sinusoidal oscillation of the deflection plane of a deflection unit that deflects a light beam, and adjusts a time period from the end of scanning of a forward path until the start of scanning of a backward path in accordance with the measured deflection frequency. Then, a light beam emitting unit is controlled so that a time period from the start of scanning until the end of scanning of the forward path matches that from the start of scanning until the end of scanning of the backward path.

[Patent Reference 1] Japanese Patent Laid-Open No. 11-95144

[Patent Reference 2] Japanese Patent Laid-Open No. 2006-162780

[Patent Reference 3] Japanese Patent Laid-Open No. 2003-177347

[Patent Reference 4] Japanese Patent Laid-Open No. 9-230277

However, the aforementioned related arts suffer the following problems.

As is known, the MEMS mirror suffers variations of the resonance characteristics of individual devices even when it is a device produced by the processes under identical conditions in the manufacturing process or a device formed on a single substrate. That is, even when the manufacturing process and operating condition remain the same, individual MEMS mirrors which are being driven have different resonance frequencies. Therefore, when an image display apparatus which displays images using a plurality of MEMS mirrors is to be implemented, a large difference is often generated between the resonance frequencies of the individual MEMS mirrors due to a change in resonance frequency caused by a change in operating temperature at the time of driving in addition to variations in the manufacturing process. When the image display apparatus using the plurality of MEMS mirrors adopts respective units disclosed in patent references 3 and 4, it is possible to optimally drive individual micromirror scanners to follow changing resonance frequencies. However, the individual MEMS mirrors are driven at different driving frequencies.

For example, in an image display apparatus which guides deflected beams by different MEMS mirrors to the right and left eyes, different display timings of right and left images due to different refresh rates of right and left images result in unnatural feeling experienced by an observer. In an image display apparatus which makes a tiling display that forms one frame by combining individual images formed by deflected beams guided by a plurality of MEMS mirrors, the boundaries between a plurality of images becomes conspicuous due to different refresh rates. As a result, the observer feels an unnatural sensation.

SUMMARY OF THE INVENTION

The present invention has been made in consideration of the aforementioned problems, and has as its object to provide a technique for providing natural images to the right and left eyes of the user upon providing independent images to the right and left eyes.

According to the first aspect of the present invention, there is provided an image display apparatus which has a plurality of sets each including an emitting unit which emits a light beam based on image information and a set operating frequency, and a deflection unit which deflects the light beam emitted by the emitting unit by a deflection operation based on the operating frequency, and presents the deflected light beam as an image to a user, the apparatus comprising: a detection unit which detects resonance frequencies of the deflection units in the respective sets; and a control unit which executes control for setting the operating frequency in the respective sets based on the respective resonance frequencies detected by the detection unit.

According to the second aspect of the present invention, there is provided an image display method executed by an image display apparatus which has a plurality of sets each including an emitting unit which emits a light beam based on image information and a set operating frequency, and a deflection unit which deflects the light beam emitted by the emitting unit by a deflection operation based on the operating frequency, and presents the deflected light beam as an image to a user, the method comprising: a detection step of detecting resonance frequencies of the deflection units in the respective sets; and a control step of executing control for setting the operating frequency in the respective sets based on the respective resonance frequencies detected in the detection step.

Further features of the present invention will become apparent from the following description of exemplary embodiments with reference to the attached drawings.

BRIEF DESCRIPTION OF THE DRAWINGS

FIG. 11B is a view for explaining modulation timing control in the modulation unit;

FIG. 11C is a view for explaining modulation timing control in the modulation unit;

FIG. 11E is a view for explaining modulation timing control in the modulation unit.

DESCRIPTION OF THE EMBODIMENTS

Preferred embodiments of the present invention will be described in detail hereinafter with reference to the accompanying drawings. Note that these embodiments will be explained as examples of the preferred arrangements of the invention described in the scope of the claims, and the invention is not limited to the embodiments to be described hereinafter.

First Embodiment

Figure 1:
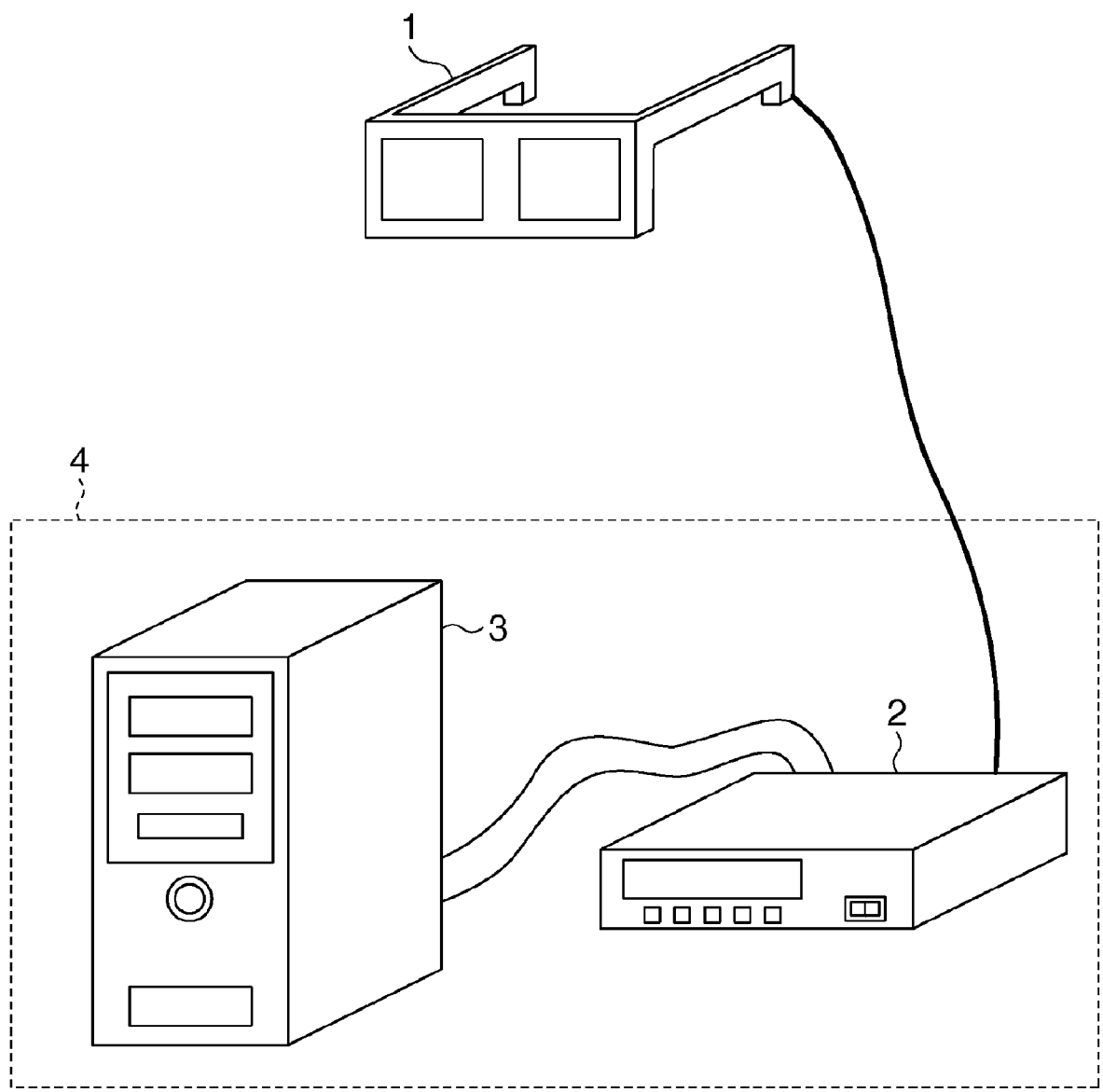
FIG. 1 is a view showing an example of the outer appearance of a system according to the first embodiment of the present invention.

FIG. 1 is a view showing an example of the outer appearance of a system according to this embodiment. This system is used to present Mixed Reality to the user, and will also be referred to as an MR system hereinafter.

As a technique for seamlessly merging the physical and virtual worlds in real time, Mixed Reality, i.e., a so-called MR technique is known. An MR system using a Head Mounted Display (or Hand Held Display) captures a physical space image acquired by an image sensing unit of the Head Mounted Display (Hand Held Display) into an image processing apparatus, and composites the captured physical space image with a CG image generated inside the image processing apparatus. Then, by displaying a composite image on a display unit, an MR space is presented to the user. Note that the Head Mounted Display will be abbreviated as an HMD, and the Hand Held Display will be abbreviated as an HHD hereinafter.

As shown in FIG. 1, the system according to this embodiment includes an HMD 1, controller 2, and PC (personal computer) 3.

The HMD 1 as a Head Mounted Display includes an image sensing unit (not shown) used to sense a moving image of the physical space, a display unit (not shown) used to display an image in front of the eyes of the user who wears the HMD 1 on the head, and a three-dimensional position and orientation sensor used to measure the position and orientation of itself. Images of respective frames (physical space images) sensed by the image sensing unit are sequentially output to the subsequent controller 2. The display unit displays an image of the physical space sensed by the image sensing unit, an image of the virtual space generated by the PC 3, and a composite image obtained by compositing, by the PC 3, the image of the physical space acquired by the PC 3 from the image sensing unit and that of the virtual space generated by the PC 3. Of course, other images may be displayed on the display unit. The three-dimensional position and orientation sensor measures the position and orientation of itself, and outputs the measurement result to the subsequent PC 3. Note that the HMD 1 may be driven either by receiving a power supply from the controller 2 or by a battery. In FIG. 1, the HMD 1 and controller 2 are connected via a cable, but they may be wirelessly connected.

The controller 2 applies image processing such as resolution conversion, color space conversion, and distortion correction of an optical system to the physical space image received from the HMD 1. The controller 2 outputs the physical space image that has undergone the image processing to the subsequent PC 3.

Upon reception of the measurement result from the HMD 1, the PC 3 calculates visual axis information of the user who wears the HMD 1, and generates a virtual space image based on the calculated information. Note that the visual axis information may be calculated using the physical space image sensed by the image sensing unit. The PC 3 generates a composite image by compositing the generated virtual space image and the physical space image output from the controller 2. The PC 3 outputs the generated composite image to the display unit of the HMD 1.

Note that FIG. 1 illustrates the controller 2 and PC 3 as independent apparatuses. However, a dedicated image processing apparatus 4 which includes the functions of the controller 2 and PC 3 may be used in place of the PC 3 and controller 2. In this case, the system includes the HMD 1 and image processing apparatus 4, which can make wired or wireless data communications with each other. Likewise, the system may be configured so that the HMD 1 includes the functions of the controller 2, and the HMD 1 and PC 3 are directly connected. Furthermore, an HMD may include the functions of all of the HMD 1, controller 2, and PC 3.

In this embodiment, the system includes the image processing apparatus 4 having the functions of the controller 2 and PC 3, and the HMD 1, and the image processing apparatus 4 and HMD 1 can make wired or wireless data communications with each other.

Figure 2:
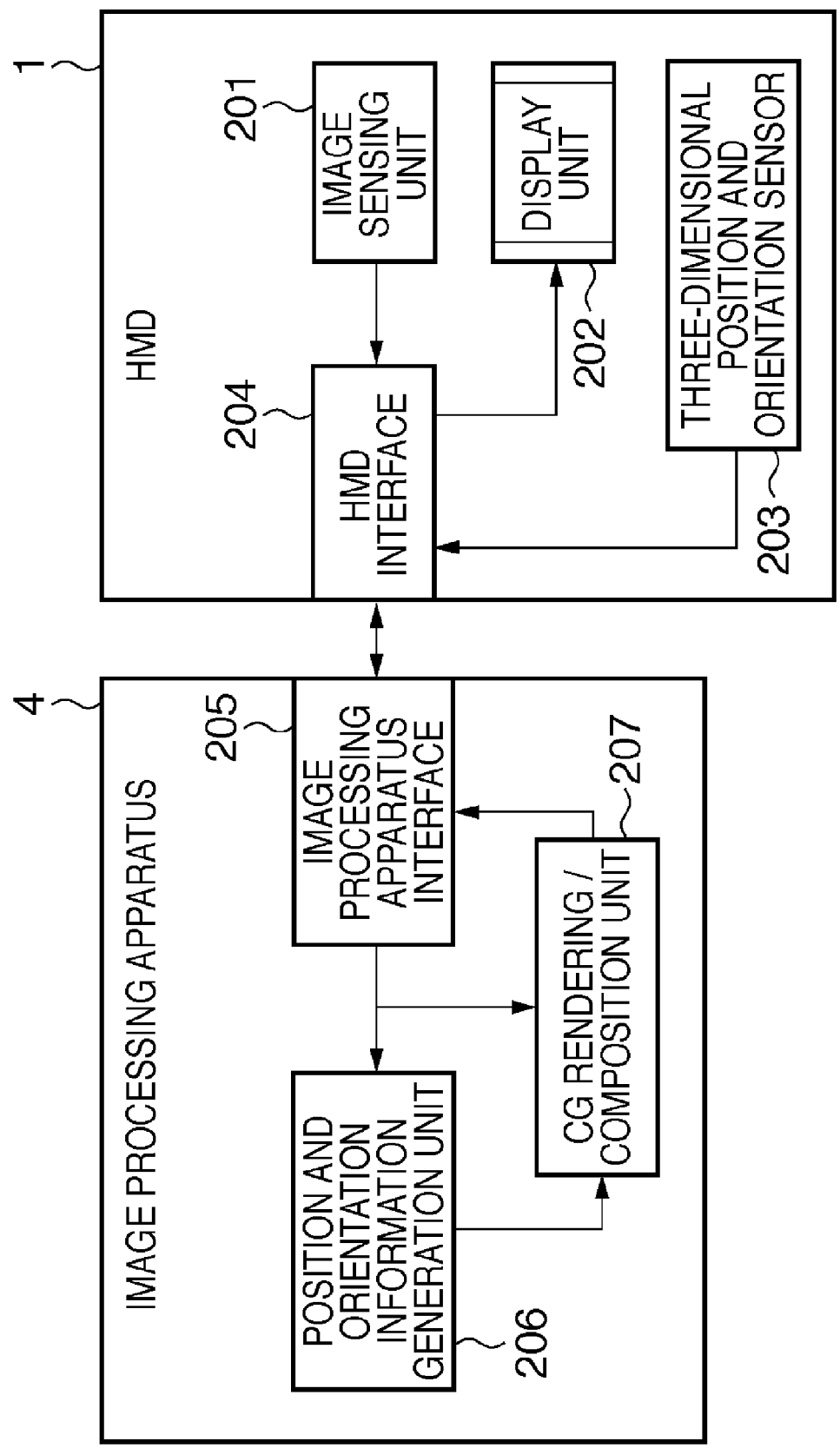
FIG. 2 is a block diagram showing an example of the functional arrangement of the system according to the first embodiment of the present invention.

FIG. 2 is a block diagram showing an example of the functional arrangement of the system according to this embodiment.

As shown in FIG. 2, the system according to this embodiment includes the image processing apparatus 4 and HMD 1.

The HMD 1 includes an image sensing unit 201, display unit 202, three-dimensional position and orientation sensor 203, and HMD interface 204. The image processing apparatus 4 includes an image processing apparatus interface 205, position and orientation information generation unit 206, and CG rendering/composition unit 207.

The HMD 1 will be described first.

The image sensing unit 201 has an image sensing optical axis that roughly matches the visual axis of the user who wears the HMD 1 on the head, and senses a moving image of an external world (physical space) that the user observes. The image sensing unit 201 has sets of image sensing elements, optical systems, and DSPs (Digital Signal Processors) in correspondence with the right and left eyes, so as to generate stereoscopic images. Images of frames (physical space images) sensed by the image sensing unit 201 are sequentially output to the HMD interface 204.

The display unit 202 is an image display apparatus which displays the physical space image sensed by the image sensing unit 201, a virtual space image (CG image) generated on the image processing apparatus 4 side, and a composite image generated by superimposing the virtual space image on the physical space image. The display unit 202 has sets of display devices and optical systems in correspondence with the right and left eyes. Each display device uses a scan type device using a MEMS mirror. The detailed arrangement of the display unit 202 will be described later with reference to FIG. 3.

The three-dimensional position and orientation sensor 203 measures the position and orientation of itself, and outputs the measurement result to the HMD interface 204. Since the sensor for measuring the position and orientation of itself is known to those who are skilled in the art, a description thereof will not be given.

The HMD interface 204 is used to output the physical space image received from the image sensing unit 201 and the measurement result received from the three-dimensional position and orientation sensor 203 to the image processing apparatus 4. Furthermore, the HMD interface 204 is used to receive image information such as a composite image and virtual space image output from the image processing apparatus 4. The HMD interface 204 may adopt a wired transmission system using a metal line such as USB, IEEE1394, or Gigabit Ethernet®, an optical fiber, or the like. The HMD interface 204 may adopt a wireless transmission system included in a WPAN (Wireless Personal Area Network) such as an IEEE802.11-based WLAN (Wireless Local Area Network), UWB (Ultra Wide Band), and Wireless HD.

The image processing apparatus 4 will be described below. The image processing apparatus 4 is generally an apparatus having an advanced arithmetic processing function and graphic display function such as a personal computer or workstation.

The image processing apparatus interface 205 may adopt either a wired or wireless transmission system as in the HMD interface 204. The image processing apparatus interface 205 receives the physical space image and the measurement result of the three-dimensional position and orientation sensor 203 transmitted from the HMD 1 via the HMD interface 204. Also, the image processing apparatus interface 205 transmits image information such as a virtual space image and composite image generated by the CG rendering/composition unit 207 to the HMD 1.

In this way, the HMD 1 and image processing apparatus 4 make data communications via the HMD interface 204 and image processing apparatus interface 205. Of course, information other than those described above may be exchanged between the HMD 1 and image processing apparatus 4.

The position and orientation information generation unit 206 generates position and orientation information of the viewpoint of the HMD 1 using the physical space image and measurement result received from the HMD 1 via the image processing apparatus interface 205. The position and orientation information of the viewpoint includes position and orientation information of the right eye and that of the left eye of the user who wears the HMD 1. Note that a technique for calculating the position and orientation information for the right and left eyes of the user using the measurement result and the physical space image is known to those who are skilled in the art, and a description thereof will not be given.

Of course, the technique for generating the position and orientation information of the viewpoint is not limited to this, and other techniques may be used. For example, the position and orientation information of the viewpoint may be generated using images sensed by objective viewpoint cameras set around the system. Also, by using a combination of the aforementioned methods, position and orientation information with higher precision can be generated.

The CG rendering/composition unit 207 generates a virtual space image using the position and orientation information generated by the position and orientation information generation unit 206. More specifically, the CG rendering/composition unit 207 sets a viewpoint having the position and orientation indicated by that position and orientation information on the virtual space, and generates an image of the virtual space (virtual space image) viewed from that viewpoint. Since a technique for generating an image of the virtual space viewed from the viewpoint having a predetermined position and orientation is known to those who are skilled in the art, a description thereof will not be given. The CG rendering/composition unit 207 generates a composite image by compositing the generated virtual space image on the physical space image received from the HMD 1 via the image processing apparatus interface 205. The CG rendering/composition unit 207 outputs the generated composite image to the image processing apparatus interface 205. Note that such composition processing is not indispensable, and the CG rendering/composition unit 207 may output the generated virtual space image to the image processing apparatus interface 205. Of course, information to be output from the CG rendering/composition unit 207 to the image processing apparatus interface 205 may be other than described above, and is not limited to the composite image and virtual space image.

The image processing apparatus interface 205 transmits the composite image or virtual space image received from the CG rendering/composition unit 207 to the HMD 1.

Note that images that can be finally displayed on the display unit 202 of the HMD 1 are the physical space image, virtual space image, and composite image, and the user can freely select which image is to be displayed. When the physical space image is displayed, an image acquired by the image sensing unit 201 may be displayed intact on the display unit 202 without transmitting the physical space image from the HMD 1 to the image processing apparatus 4.

Figure 3:
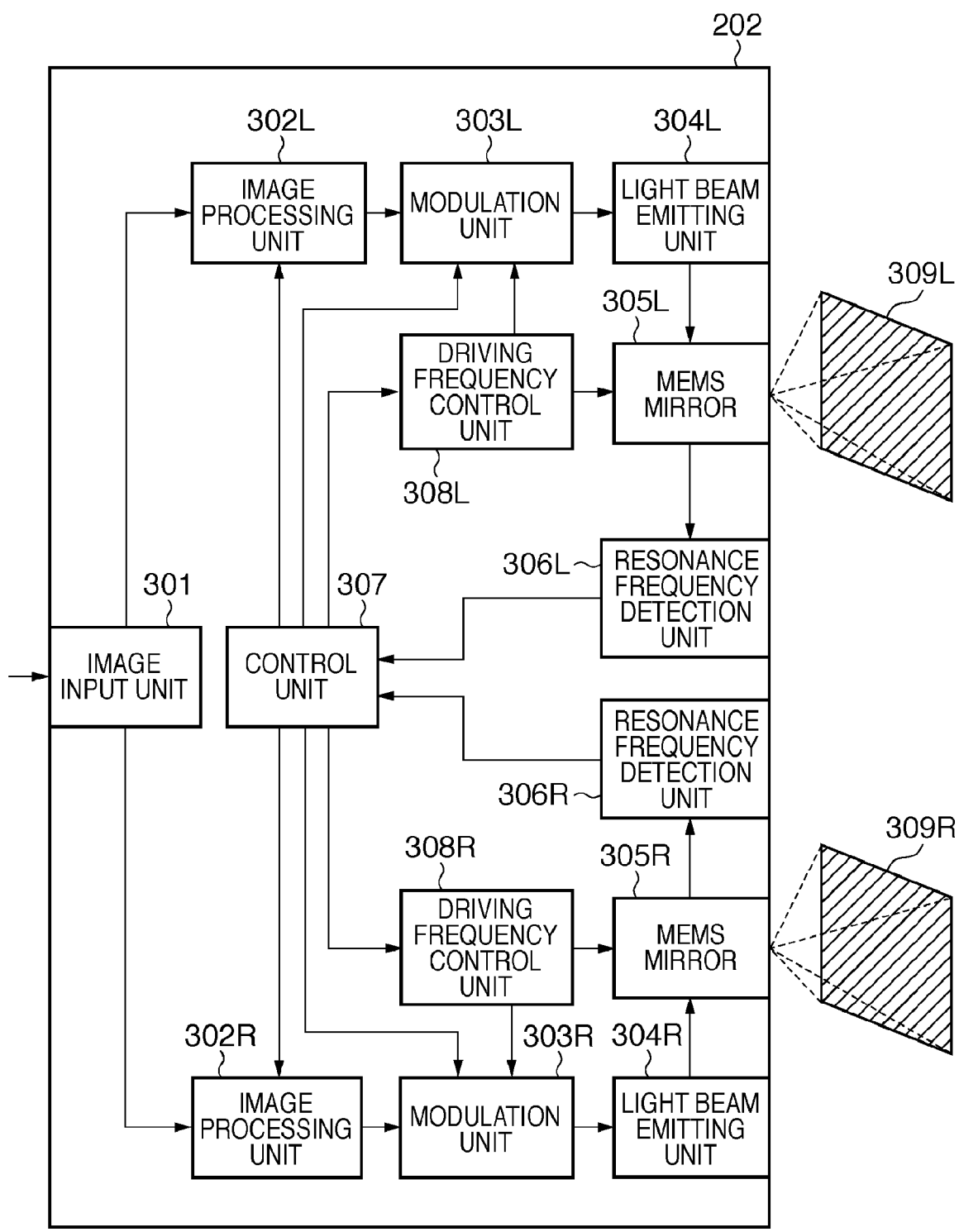
FIG. 3 is a block diagram showing an example of the functional arrangement of a display unit 202 shown in FIG. 2.

FIG. 3 is a block diagram showing an example of the functional arrangement of the display unit 202 shown in FIG. 2. Note that in FIG. 3 (including other drawings), components denoted by reference numerals with R are those for the right eye, and components denoted by reference numerals with L are those for the left eye.

That is, in FIG. 3, an image processing unit 302L, modulation unit 303L, driving frequency control unit 308L, light beam emitting unit 304L, MEMS mirror 305L, and resonance frequency detection unit 306L are components required to provide an image to the left eye of the user who wears the HMD 1 on the head. Likewise, an image processing unit 302R, modulation unit 303R, driving frequency control unit 308R, light beam emitting unit 304R, MEMS mirror 305R, and resonance frequency detection unit 306R are components required to provide an image to the right eye of the user who wears the HMD 1 on the head.

When results obtained by removing R and L from reference numerals indicate the same reference numeral, these components perform the same operation (for example, the image processing unit 302R and image processing unit 302L perform the same operation). Therefore, the operations of an image input unit 301, a control unit 307, and the components for the left eye (the image processing unit 302L, modulation unit 303L, driving frequency control unit 308L, light beam emitting unit 304L, MEMS mirror 305L, and resonance frequency detection unit 306L) will be described below. That is, operation descriptions of the components for the right eye are the same as those for the components for the left eye with the corresponding reference numerals (for example, the operation description of the image processing unit 302R is the same as that of the image processing unit 302L).

The image input unit 301 receives, as image information, the physical space image acquired from the image sensing unit 201 or the virtual space image or composite image acquired from the image processing apparatus 4 via the image processing apparatus interface 205, and outputs the received image information to the image processing units 302R and 302L.

Upon reception of the image information from the image input unit 301, the image processing unit 302L applies image processing including resolution conversion and line decimation processing to that image information in accordance with a control instruction from the control unit 307. The image processing unit 302L outputs the image information after the image processing to the subsequent modulation unit 303L.

The modulation unit 303L generates a modulated signal used to control the light amount of a light beam (beam light amount) to be emitted by the light beam emitting unit 304L based on the image information from the image processing unit 302L and a driving frequency (operating frequency) controlled by the driving frequency control unit 308L.

The light beam emitting unit 304L emits a light beam based on the modulated signal generated by the modulation unit 303L.

The MEMS mirror 305L forms a display image 309L for the left eye by deflecting the light beam emitted by the light beam emitting unit 304L.

Figure 4:
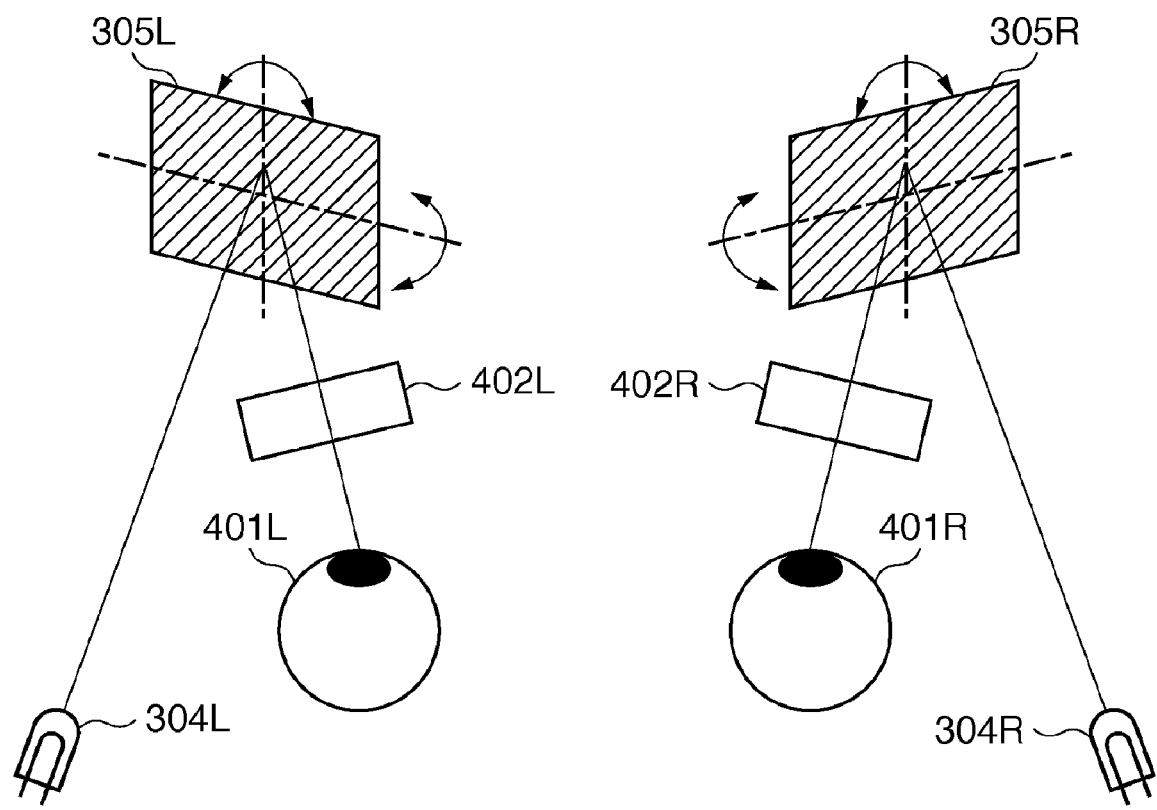
FIG. 4 is a view for explaining a mechanism for deflecting a light beam emitted by a light beam emitting unit 304L (304R) using a MEMS mirror 305L (305R), and providing the deflected beam to the left eye (right eye) of the user as a display image 309L (309R)

FIG. 4 is a view for explaining a mechanism for deflecting a light beam emitted by the light beam emitting unit 304L (304R) using the MEMS mirror 305L (305R), and providing the deflected light beam to the left eye (right eye) of the user as the display image 309L (309R).

The display image 309L for the left eye can be formed by two-dimensionally deflecting a light beam emitted by the light beam emitting unit 304L using the MEMS mirror 305L, and guiding the deflected light beam to the retina (not shown) of a left eye 401L of the user via an optical system 402L.

Likewise, the display image 309R for the right eye can be formed by two-dimensionally deflecting a light beam emitted by the light beam emitting unit 304R using the MEMS mirror 305R, and guiding the deflected light beam to the retina (not shown) of a right eye 401R of the user via an optical system 402R.

Note that the optical system 402L (402R) is not limited to a single optical element and may include a plurality of optical elements. Also, an arrangement in which a display image to be observed may be formed by projecting a light beam deflected by the MEMS mirror 305L (305R) onto a diffusing plate may be adopted. The two-dimensional deflection of a light beam can be realized using a MEMS mirror as a single device which has two axes in the horizontal and vertical directions, and is oscillatable about the respective axes, as shown in FIG. 4. Also, the two-dimensional deflection can be realized by combining two devices each of which is oscillatable about only one axis, and respectively using them as a horizontal deflection MEMS mirror and vertical deflection MEMS mirror. When the display images 309R and 309L are defined as images for the right and left eyes having a disparity, stereoscopic images that allow stereoscopic viewing can be presented to the user who wears the HMD 1 on the head.

Referring back to FIG. 3, the resonance frequency detection unit 306L detects the resonance frequency of the MEMS mirror 305L in a driving state, and sends the detection result to the control unit 307.

Therefore, the control unit 307 can acquire the resonance frequencies of the MEMS mirrors 305R and 305L from the resonance frequency detection units 306R and 306L. Hence, the control unit 307 calculates the difference between the resonance frequencies, and controls the image processing unit 302L (302R), modulation unit 303L (303R), and driving frequency control unit 308L (308R) in accordance with the calculated difference. Details of such control will be described later.

Note that FIG. 3 illustrates only one control unit 307. However, control units may be provided to the right and left eyes of the user, respectively. Then, by sharing control information between these control units, the same control may be executed.

Figure 5:
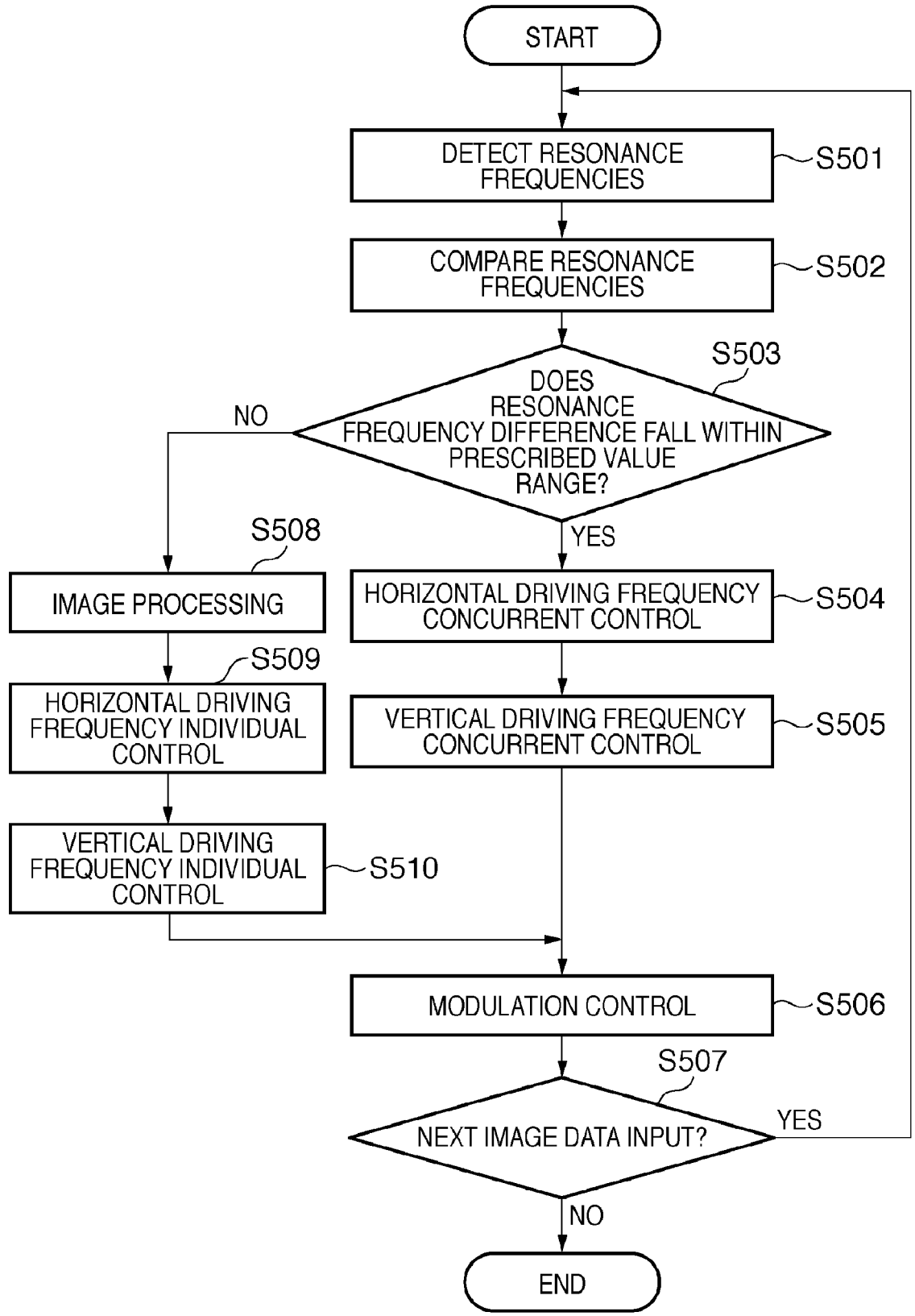
FIG. 5 is a flowchart of processing executed by the display unit 202.

FIG. 5 is a flowchart showing processing executed by the display unit 202.

In step S501, the resonance frequency detection unit 306L detects the horizontal resonance frequency of the MEMS mirror 305L, and outputs information indicating the detected resonance frequency to the control unit 307. In this step, the resonance frequency detection unit 306R detects the horizontal resonance frequency of the MEMS mirror 305R, and outputs information indicating the detected resonance frequency to the control unit 307.

In step S502, the control unit 307 compares the resonance frequency indicated by the information obtained from the resonance frequency detection unit 306L and that indicated by the information obtained from the resonance frequency detection unit 306R, and calculates their difference.

The control unit 307 checks in step S503 if the difference calculated in step S502 falls within a prescribed value range. Since a method of determining the prescribed value of the difference between the resonance frequencies is largely related to frequency control processing (to be described later) required for horizontal deflection driving, it will be described later together with the description of that control processing.

As a result of checking in step S503, if it is determined that the difference falls within the prescribed value range, the process advances to step S504.

In step S504, the control unit 307 sets a driving frequency f required to drive the MEMS mirror 305L to deflect in the horizontal direction in the driving frequency control unit 308L (first control). Furthermore, the control unit 307 sets the driving frequency f required to drive the MEMS mirror 305R to deflect in the horizontal direction in the driving frequency control unit 308R. That is, the control unit 307 sets the same driving frequency (=f) in the driving frequency control units 308R and 308L. As a result, the MEMS mirrors 305R and 305L make deflection operations in the horizontal direction at the same driving frequency.

Note that processing is relatively easy if the driving frequency f (operating frequency f) is set to have equal differences from the horizontal resonance frequencies of the MEMS mirrors 305R and 305L. Letting fR and fL be the horizontal resonance frequencies of the MEMS mirrors 305R and 305L, the horizontal driving frequency f is set to satisfy f=(fL+fR)/2. That is, by setting the driving frequency f as an average value of fR and fL, the above condition is achieved.

However, the present invention is not limited to use of the average value as the driving frequency f. For example, of fM between fR and fL, arbitrary fM may be set as the driving frequency f in consideration of the temperature characteristics of the MEMS mirrors 305R and 305L, which are recognized in advance. As an example of such arbitrary driving frequency f, the driving frequency f may be selected so as to maximize the amplitude of the MEMS mirror which has a smaller oscillation amplitude upon driving the MEMS mirrors 305R and 305L at an arbitrary driving frequency. As for selection of the driving frequency f, the oscillation amplitudes of the MEMS mirrors 305R and 305L can assume values that can achieve minimum oscillation amplitudes required to form the display images 309R and 309L, and the present invention is not limited to the aforementioned value.

Therefore, the "prescribed value of the difference between the resonance frequencies" used in the comparison processing in step S503 can be calculated as follows. That is, the prescribed value is determined so as to determine f that allows both the MEMS mirrors 305R and 305L to achieve minimum oscillation amplitudes required to display images for one frame in the horizontal driving frequency control in step S504. In other words, if at least one f which allows both the MEMS mirrors 305R and 305L to achieve minimum oscillation amplitudes required to display images for one frame is included between fR and fL, (fL−fR) or (fR−fL) can be selected as the prescribed value.

After the driving frequency f is set in step S504, the control unit 307 sets a driving frequency g (operating frequency g) required to drive the MEMS mirror 305L to deflect in the vertical direction in the driving frequency control unit 308L in step S505. Furthermore, the control unit 307 sets the driving frequency g required to drive the MEMS mirror 305R to deflect in the vertical direction in the driving frequency control unit 308R. That is, the control unit 307 sets the same driving frequency (=g) in the driving frequency control units 308R and 308L. In general, in image display using MEMS mirrors, the vertical driving frequency can be equal to or smaller than (1/the number of vertical pixels) (the reciprocal number of the number of lines) with respect to the horizontal driving frequency. For this reason, it is easy to control the vertical driving frequency in correspondence with the horizontal driving frequency.

In step S506, the driving frequency control unit 308L controls the modulation timing of the modulation unit 303L based on the driving frequencies f and g set by the control unit 307. As a result, the modulation unit 303L generates a modulated signal according to the image information output from the image processing unit 302L in correspondence with the driving frequencies f and g set by the control unit 307. The light beam emitting unit 304L emits a light beam based on that modulated signal. The MEMS mirror 305L deflects the light beam emitted by the light beam emitting unit 304L by performing deflection operations based on the driving frequencies f and g set in the driving frequency control unit 308L by the control unit 307, thus presenting the display image 309L to the left eye of the user. Also, in step S506 the driving frequency control unit 308R controls the modulation timing of the modulation unit 303R based on the driving frequencies f and g set by the control unit 307. As a result, the modulation unit 303R generates a modulated signal according to the image information output from the image processing unit 302R in correspondence with the driving frequencies f and g set by the control unit 307. The light beam emitting unit 304R emits a light beam based on that modulated signal. The MEMS mirror 305R deflects the light beam emitted by the light beam emitting unit 304R by performing deflection operations based on the driving frequencies f and g set in the driving frequency control unit 308R by the control unit 307, thus presenting the display image 309R to the right eye of the user.

On the other hand, as a result of checking in step S503, if the difference between the resonance frequencies of the MEMS mirrors 305R and 305L falls outside the prescribed value range, the process advances to step S508.

As described above, in this embodiment, the image information input to the image input unit 301 is input to the image processing units 302R and 302L. That is, since images for the right and left eyes are those having the same number of pixels, if the difference between the resonance frequencies of the MEMS mirrors 305R and 305L falls outside the prescribed value range, a problem of changes of the refresh rates of images to be guided to the right and left eyes is posed.

To solve this problem, the image processing unit which processes image information of an image to be displayed by the MEMS mirror with a lower resonance frequency has to execute processing for reducing the vertical resolution (the number of lines) by executing processing for reducing the number of lines of the input image information to reduce the resolution.

In step S508, if the resonance frequency of the MEMS mirror 305L<that of the MEMS mirror 305R, the control unit 307 controls the image processing unit 302L to execute number-of-lines reduction processing such as line decimation or resolution conversion with respect to the image information input from the image input unit 301.

Let fL be the resonance frequency of the MEMS mirror 305L, fR be that of the MEMS mirror 305R, LL be the number of lines of image information after the number-of-lines reduction processing by the image processing unit 302L, and LR be the number of lines of image information output from the image processing unit 302R. Of course, fL<fR, and the image processing unit 302R does not execute the number-of-lines reduction processing. In this case, the image processing unit 302L determines the number LL of lines after the number-of-lines reduction processing to meet:

$$LL \leq fL/fR \times LR$$

Note that when the resonance frequency of the MEMS mirror 305L>that of the MEMS mirror 305R, the control unit 307 controls the image processing unit 302R to execute number-of-lines reduction processing such as line decimation or resolution conversion with respect to the image information input from the image input unit 301.

Let fL be the resonance frequency of the MEMS mirror 305L, fR be that of the MEMS mirror 305R, LR be the number of lines of image information after the number-of-lines reduction processing by the image processing unit 302R, and LL be the number of lines of image information output from the image processing unit 302L. Of course, fL>fR, and the image processing unit 302L does not execute the number-of-lines reduction processing. In this case, the image processing unit 302R determines the number LR of lines after the number-of-lines reduction processing to meet:

$$LR \leq fR/fL \times LL$$

In this way, in step S508 the image processing unit which processes image information of an image to be displayed by the MEMS mirror with a lower resonance frequency is controlled to execute the number-of-lines reduction processing for the input image information, thus updating the image information. Note that the image processing unit which does not execute the number-of-lines reduction processing outputs image information having the same number of lines as the image information input to that image processing unit.

Note that in step S508 the control unit 307 may control the image processing units 302R and 302L to execute number-of-lines reduction processing so as to satisfy fR:fL=LR:LL.

With the aforementioned image processing, since time periods required to display images for one frame for the right and left eyes become equal to each other, the refresh rate difference can be eliminated.

In step S509, the control unit 307 sets the resonance frequency of the MEMS mirror 305L or a frequency close to that resonance frequency in the driving frequency control unit 308L as a driving frequency required to drive the MEMS mirror 305L to deflect in the horizontal direction. Likewise, the control unit 307 sets the resonance frequency of the MEMS mirror 305R or a frequency close to that resonance frequency in the driving frequency control unit 308R as a driving frequency required to drive the MEMS mirror 305R to deflect in the horizontal direction.

When the horizontal driving frequencies of the MEMS mirrors 305R and 305L are to be adjusted, since their oscillation amplitudes are reduced, a display area required to display an image for one frame can no longer be formed. In such case, like in step S509, the control for driving the MEMS mirrors 305R and 305L independent horizontal driving frequencies is executed. Assume that the respective horizontal driving frequencies for driving the MEMS mirrors 305R and 305L are values that can achieve minimum oscillation amplitudes required to display images for one frame. For example, a method of determining the respective driving frequencies in correspondence with the individual horizontal resonance frequencies of the MEMS mirrors 305R and 305L, as described above, may be used.

In step S510, the control unit 307 sets a driving frequency required to drive the MEMS mirror 305L to deflect in the vertical direction in the driving frequency control unit 308L. Furthermore, the control unit 307 sets a driving frequency required to drive the MEMS mirror 305R to deflect in the vertical direction in the driving frequency control unit 308R. The method of calculating the driving frequency required to deflect in the vertical direction is as described above. That is, since the vertical driving frequency can be equal to or smaller than (1/the number of vertical pixels) with respect to the horizontal driving frequency, it is easy to control the vertical driving frequency in correspondence with the horizontal driving frequency.

With the aforementioned control (second control), the refresh rates of the display images to be guided to the right and left eyes can be adjusted.

Next, in step S506 the driving frequency control unit 308L controls the modulation timing of the modulation unit 303L based on the driving frequencies set by the control unit 307. As a result, the modulation unit 303L generates a modulated signal according to the image information output from the image processing unit 302L in correspondence with the driving frequencies set by the control unit 307. The light beam emitting unit 304L emits a light beam based on that modulated signal. The MEMS mirror 305L deflects the light beam emitted by the light beam emitting unit 304L by performing deflection operations based on the driving frequencies set in the driving frequency control unit 308L by the control unit 307, thus presenting the display image 309L to the left eye of the user. Also, in step S506 the driving frequency control unit 308R controls the modulation timing of the modulation unit 303R based on the driving frequencies set by the control unit 307. As a result, the modulation unit 303R generates a modulated signal according to the image information output from the image processing unit 302R in correspondence with the driving frequencies set by the control unit 307. The light beam emitting unit 304R emits a light beam based on that modulated signal. The MEMS mirror 305R deflects the light beam emitted by the light beam emitting unit 304R by performing deflection operations based on the driving frequencies set in the driving frequency control unit 308R by the control unit 307, thus presenting the display image 309R to the right eye of the user.

Since the image input unit 301 notifies the control unit 307 of reception of no image information for a predetermined period of time or longer, the control unit 307 checks in step S507 if reception of image information is stopped. As a result of checking, if reception of image information is stopped, this processing ends. On the other hand, if reception of image information is not stopped, the process returns to step S501 to execute subsequent processes for image information of the next frame.

With the aforementioned processing, the control for adapting the refresh rates of display images to be guided to the right and left eyes can be done while following the resonance frequency variations of the MEMS mirrors 305R and 305L, which are being driven.

FIGS. 11A to 11E are views for explaining the modulation timing control in the modulation unit.

Figure 11A:
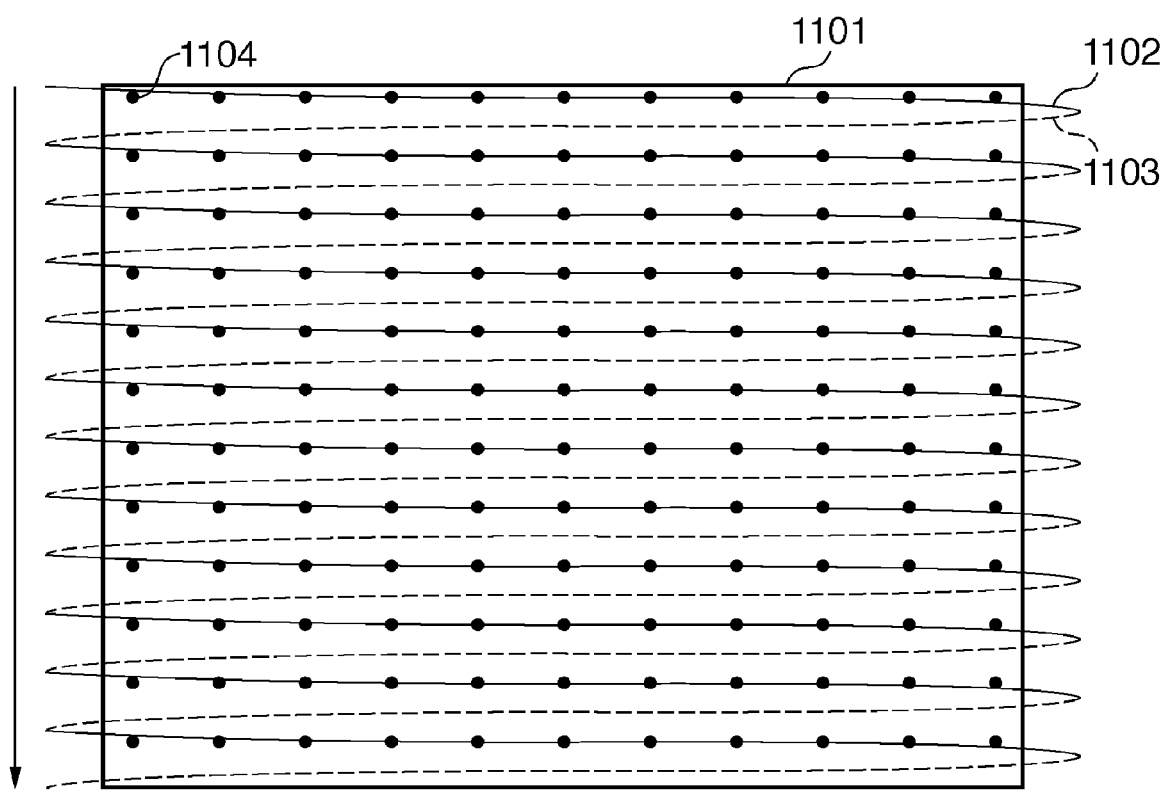
FIG. 11A is a view for explaining modulation timing control in a modulation unit.

FIG. 11A shows a display image upon supplying a modulated signal to the MEMS mirror driven at a rotation angle of a frequency $f_{High}$, as shown in FIG. 11B. In FIG. 11B, assume that the MEMS mirror scans on a forward path scan line 1102 indicated by the solid line in a display image 1101 shown in FIG. 11A during an increasing interval of the rotation angle. Also, assume that the MEMS mirror scans on a backward path scan line 1103 indicated by the dotted line in the display image 1101 during a decreasing interval of the rotation angle. At this time, when a light beam is emitted based on a modulated signal having a period T1 and is deflected by the MEMS mirror, it is guided to a position indicated by a point 1104 in FIG. 11A. Therefore, since irradiated points of the light beam are evenly allocated in the display image 1101, a display image free from any distortion can be formed.

Figure 11D:
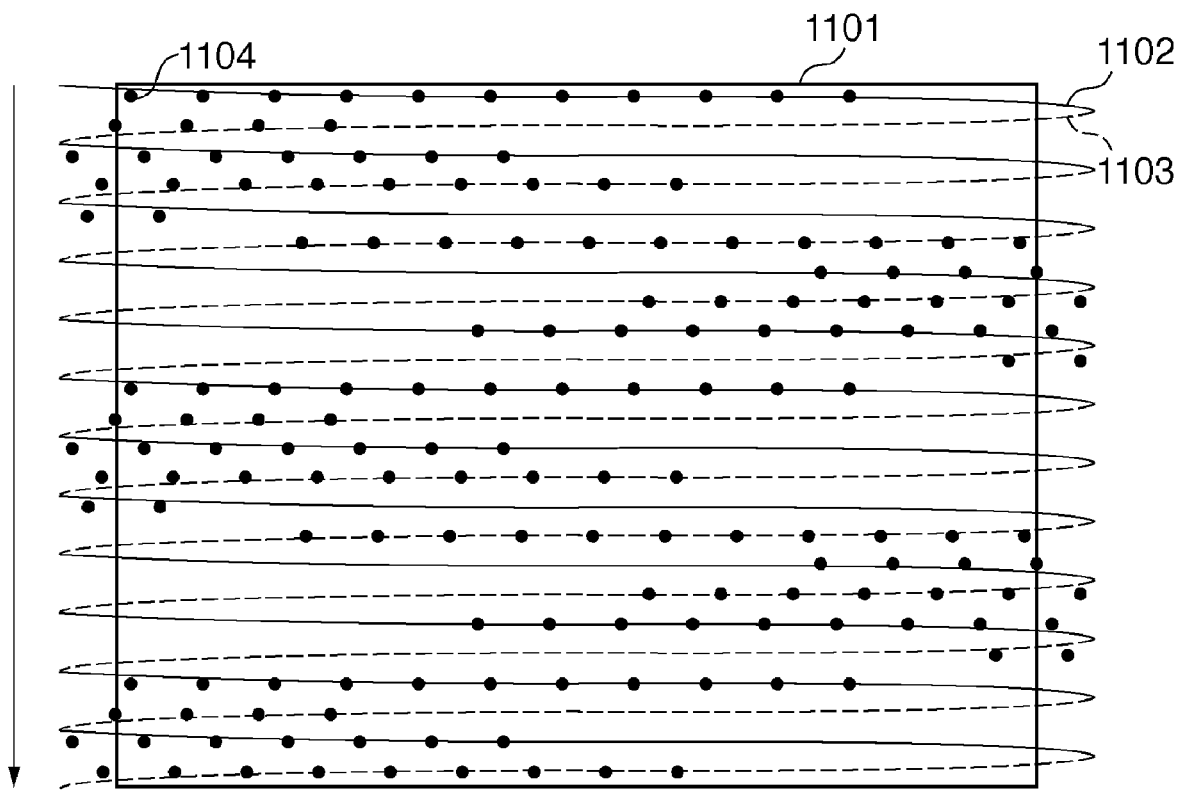
FIG. 11D is a view for explaining modulation timing control in the modulation unit.

On the other hand, upon shifting of the resonance frequency due to a change in temperature at the time of driving, when the driving frequency is changed to follow the shifted resonance frequency, and the MEMS mirror is driven at a rotation angle of a frequency $f_{Low}$, as shown in FIG. 11C, the periods of the rotation angle and modulated signal cannot be matched. As a result, since not only the amplitude of the forward path scan line 1102 is shifted from the point 1104 (light beam irradiated point), and a light beam is irradiated even during scanning on the backward path scan line 1103, as shown in FIG. 11D, a display image suffers a distortion. In this embodiment, since the modulation unit generates a modulated signal by controlling the modulation timing in correspondence with the driving frequency, as shown in FIG. 11E, the timings of the forward path scan and light beam irradiation can be adjusted. As a result, the display image free from any distortion can be formed, as shown in FIG. 11A.

As described above, according to this embodiment, the driving frequencies of the plurality of MEMS mirrors can be adjusted in accordance with the resonance frequencies of the respective MEMS mirrors, or the refresh rates can be adjusted even when the driving frequencies themselves are different. As a result, unnaturalness of display images guided to the right and left eyes by the respective MEMS mirrors can be reduced, and stereoscopic images with high presence can be presented to the user who wears the HMD on the head. Hence, the user can experience natural stereoscopic viewing.

Second Embodiment

The first embodiment has explained the image display system which makes a stereoscopic display using a plurality of two-dimensionally deflectable MEMS mirrors. By contrast, a system of this embodiment makes a tiling display that forms one frame by combining individual images guided by a plurality of two-dimensionally deflectable MEMS mirrors.

The functional arrangement example of the system according to this embodiment uses that shown in FIG. 2 as in the first embodiment, except for the arrangement of the display unit 202.

Figure 6:
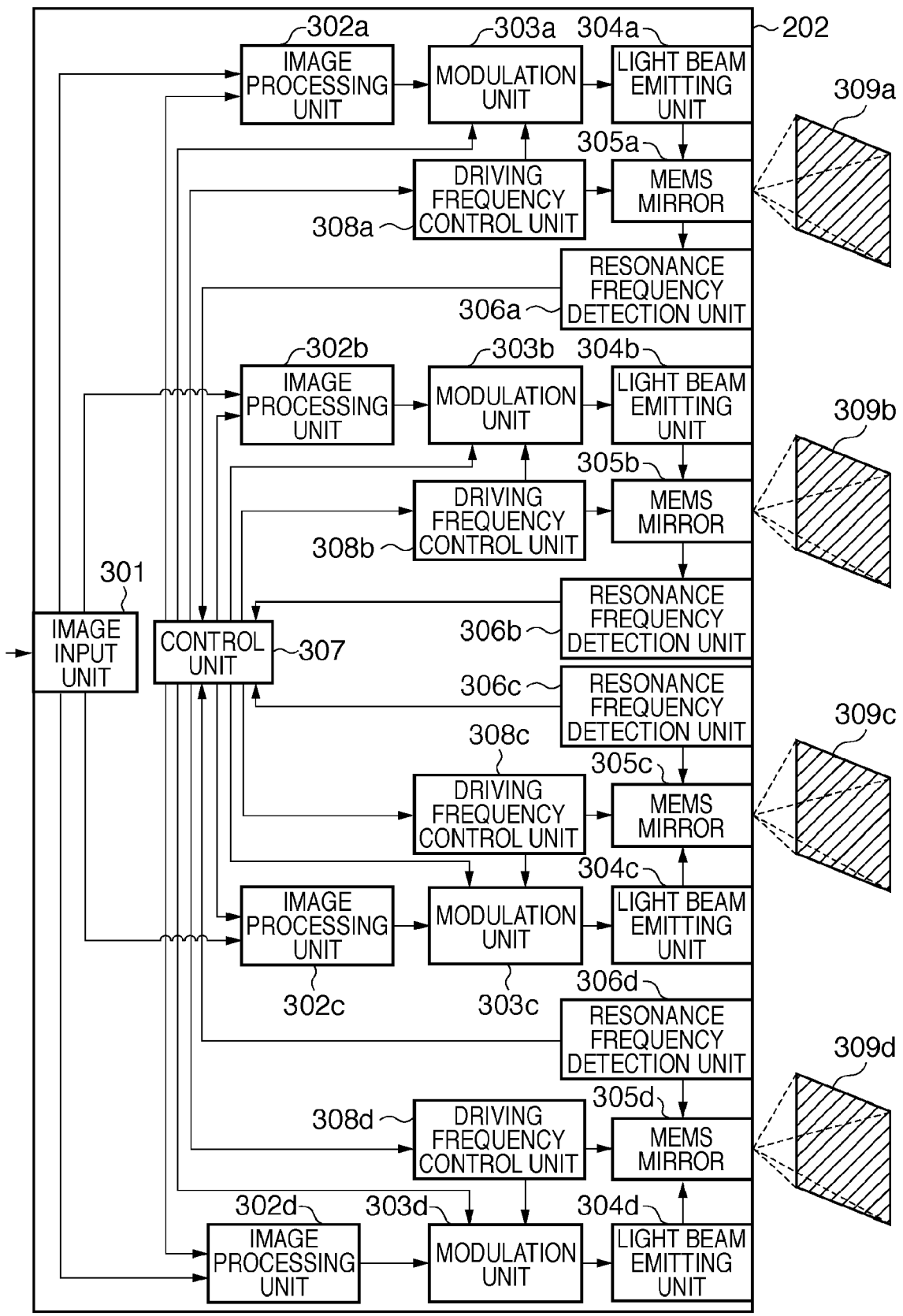
FIG. 6 is a block diagram showing an example of the functional arrangement of the display unit 202 according to the second embodiment of the present invention.

FIG. 6 is a block diagram showing an example of the functional arrangement of the display unit 202 according to this embodiment.

A set of an image processing unit 302a, modulation unit 303a, driving frequency control unit 308a, light beam emitting unit 304a, MEMS mirror 305a, and resonance frequency detection unit 306a will be referred to as a "set a" hereinafter.

Likewise, a set of an image processing unit 302b, modulation unit 303b, driving frequency control unit 308b, light beam emitting unit 304b, MEMS mirror 305b, and resonance frequency detection unit 306b will be referred to as a "set b" hereinafter.

Also, a set of an image processing unit 302c, modulation unit 303c, driving frequency control unit 308c, light beam emitting unit 304c, MEMS mirror 305c, and resonance frequency detection unit 306c will be referred to as a "set c" hereinafter.

Furthermore, a set of an image processing unit 302d, modulation unit 303d, driving frequency control unit 308d, light beam emitting unit 304d, MEMS mirror 305d, and resonance frequency detection unit 306d will be referred to as a "set d" hereinafter.

As described above, the display unit 202 according to this embodiment has a plurality of such sets. Note that the sets a to d perform the same operation, and output independent images. Note that any of these sets is the same as that of the components required to present an image to the left eye (right eye) of the user who wears the HMD 1 on the head, as described in the first embodiment.

In the first embodiment, the control unit 307 controls the driving frequency control unit 308L (308R), modulation unit 303L (303R), and image processing unit 302L (302R) according to the two resonance frequencies. However, in this embodiment, since the control unit 307 executes control in accordance with the output results of the four resonance frequency detection units 306a to 306d, the processing contents are different from the first embodiment in, especially, association with the driving frequency control. In this embodiment, the horizontal driving frequency f of the respective MEMS mirrors 305a to 305d is determined within a range included between the maximum and minimum horizontal resonance frequencies of those of the MEMS mirrors 305a to 305d. As an example of the horizontal driving frequency f, letting fa, fb, fc, and fd be the horizontal resonance frequencies of the MEMS mirrors 305a to 305d, f=(fa+fb+fc+fd)/4 is set.

That is, the average value of fa, fb, fc, and fd is set as the horizontal driving frequency f of the respective MEMS mirrors 305a to 305d.

As in the system of the first embodiment, in the horizontal driving frequency control of this embodiment as well, the present invention is not limited to driving at the average driving frequency. That is, the MEMS mirrors may be driven at arbitrary f in consideration of the temperature characteristics of the MEMS mirrors 305a to 305d, which are recognized in advance. As an example of such arbitrary f, the horizontal driving frequency f may be selected so as to maximize the amplitude of the MEMS mirror which has a smaller oscillation amplitude upon driving the MEMS mirrors 305a to 305d at arbitrary f. As for selection of the driving frequency f, all the oscillation amplitudes of the MEMS mirrors 305a to 305d can assume values that can achieve minimum oscillation amplitudes required to form display images 309a to 309d, and the present invention is not limited to the aforementioned value.

Figure 7:
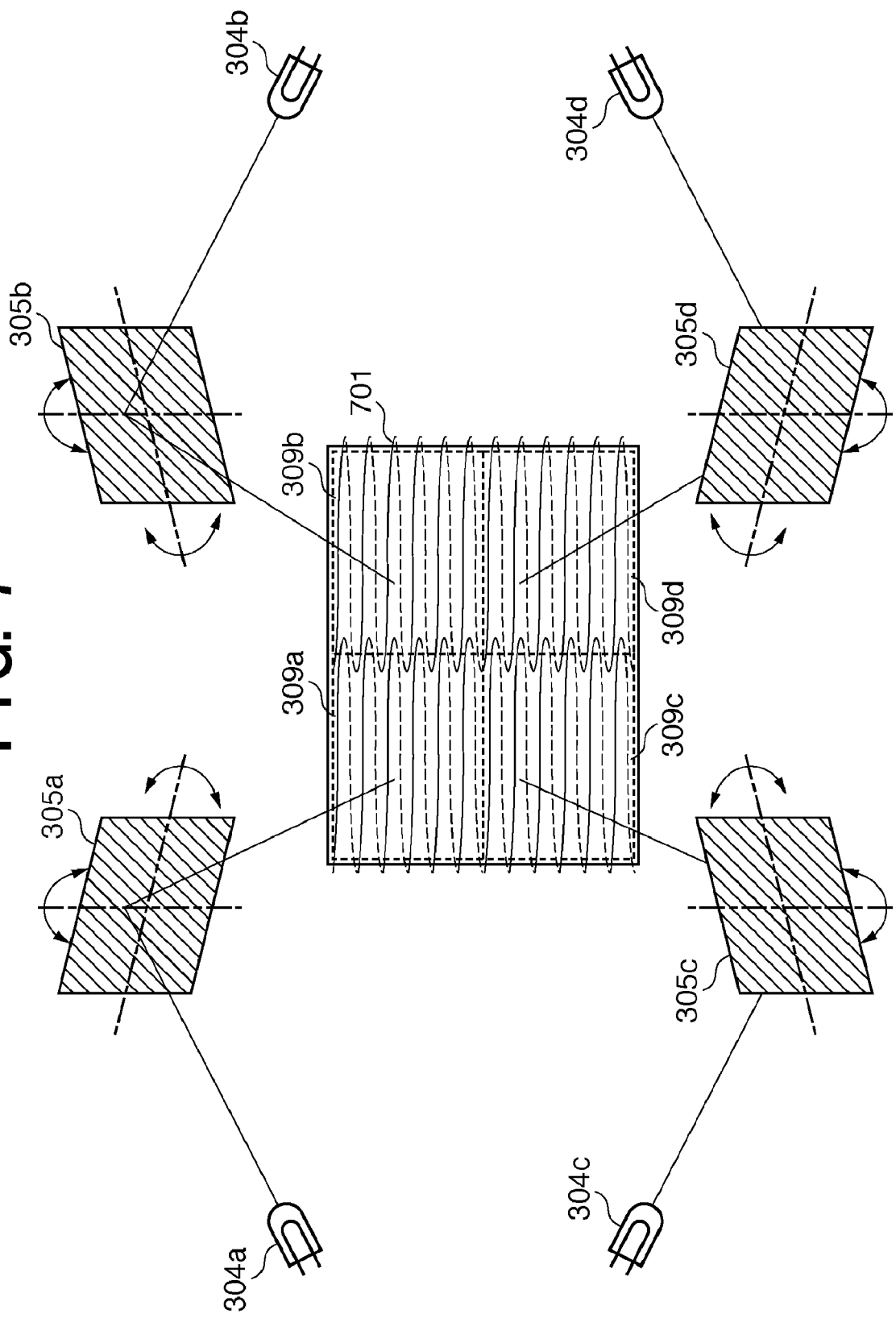
FIG. 7 is a view for explaining formation of a tiling display image by diffusing plate projection using four two-dimensionally deflectable MEMS mirrors 305a to 305d.
Figure 8:
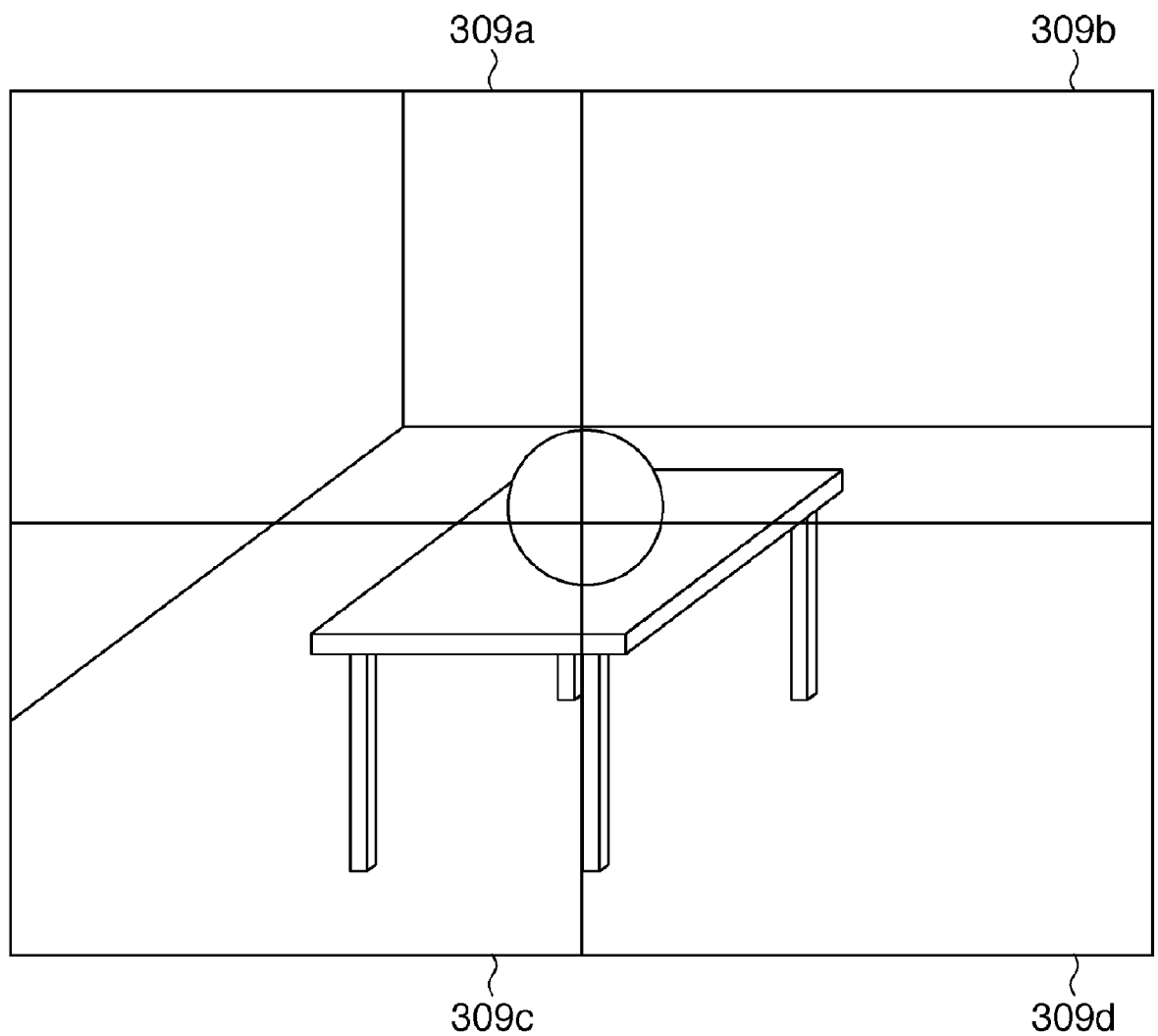
FIG. 8 is a view showing a display image example of the tiling display using the four two-dimensionally deflectable MEMS mirrors 305a to 305d.

FIG. 7 is a view for explaining formation of a tiling display image by diffusing plate projection using the four two-dimensionally deflectable MEMS mirrors 305a to 305d. FIG. 8 is a view showing a display image example of the tiling display using the four two-dimensionally deflectable MEMS mirrors 305a to 305d.

A display image 309a is formed by two-dimensionally deflecting a light beam emitted by the light beam emitting unit 304a using the MEMS mirror 305a. A display image 309b is formed by two-dimensionally deflecting a light beam emitted by the light beam emitting unit 304b using the MEMS mirror 305b. A display image 309c is formed by two-dimensionally deflecting a light beam emitted by the light beam emitting unit 304c using the MEMS mirror 305c. A display image 309d is formed by two-dimensionally deflecting a light beam emitted by the light beam emitting unit 304d using the MEMS mirror 305d.

By projecting the respective display images 309a to 309d onto a diffusing plate 701 by the corresponding MEMS mirrors 305a to 305d to be two-dimensionally arranged, as shown in FIG. 7, one image can be formed, as shown in FIG. 8. At this time, when the display images 309a to 309d have overlap parts in association with their neighboring boundary areas, a natural display image free from any discontinuity at the boundary parts between neighboring display images can be generated.

Figure 9:
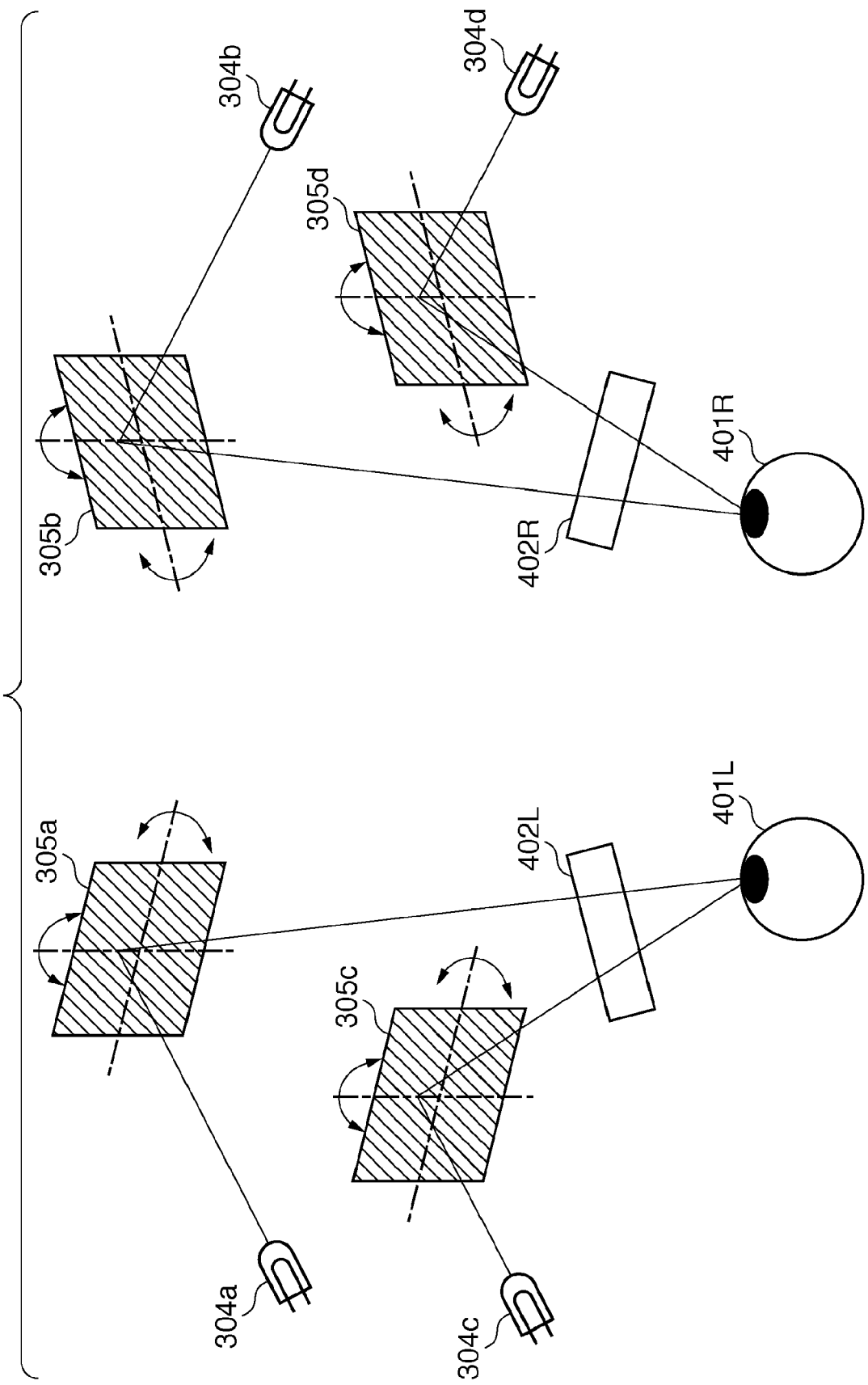
FIG. 9 is a view for explaining a tiling stereoscopic display using the four two-dimensionally deflectable MEMS mirrors.

FIG. 9 is a view for explaining a tiling stereoscopic display using the four two-dimensionally deflectable MEMS mirrors.

Figure 10B:
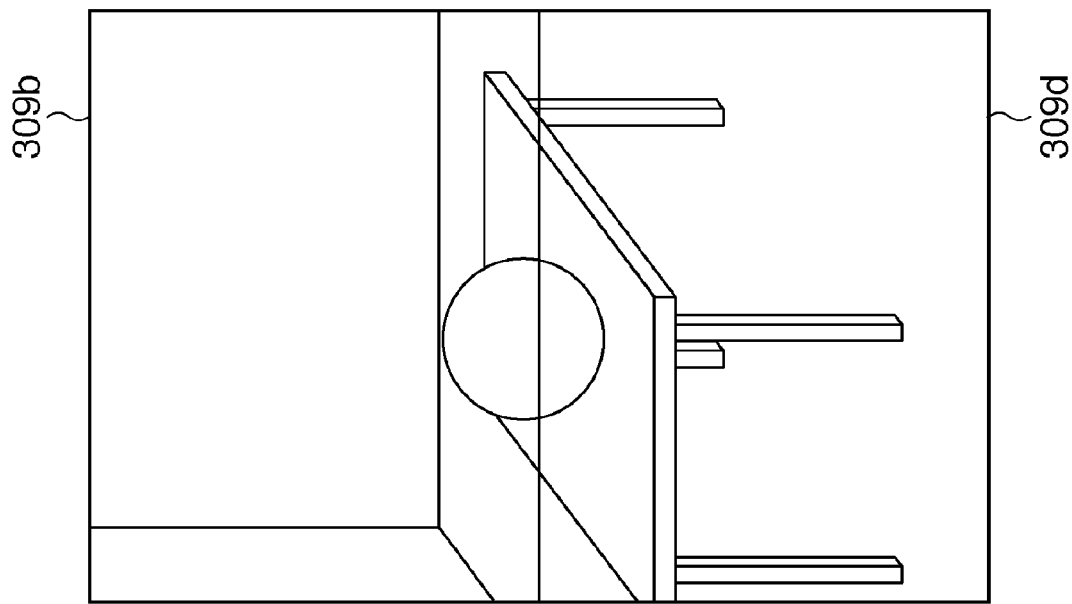
FIG. 10B is a view for explaining a mechanism for deflecting light beams emitted by light beam emitting units 304b and 304d using MEMS mirrors 305b and 305d, respectively, and providing the deflected light beams to a right eye 401R of the user as display images.
Figure 10A:
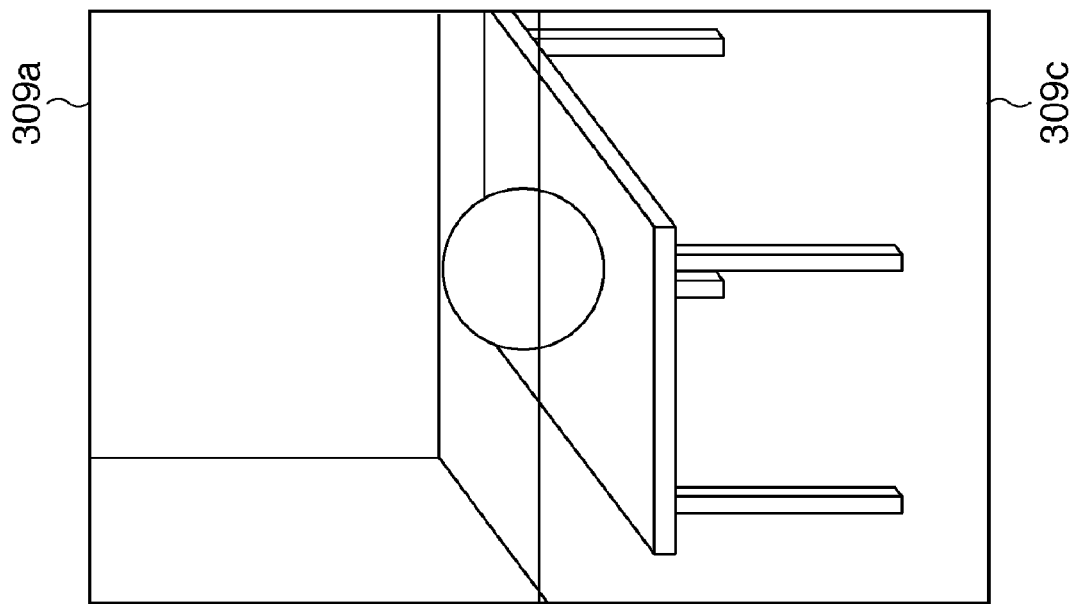
FIG. 10A is a view for explaining a mechanism for deflecting light beams emitted by light beam emitting units 304a and 304c using MEMS mirrors 305a and 305c, respectively, and providing the deflected light beams to a left eye 401L of the user as display images.

FIG. 10A is a view for explaining a mechanism for deflecting light beams emitted from the light beam emitting units 304a and 304c by the MEMS mirrors 305a and 305c, respectively, and providing the deflected light beams to the left eye 401L of the user as display images. FIG. 10B is a view for explaining a mechanism for deflecting light beams emitted by the light beam emitting units 304b and 304d using the MEMS mirrors 305b and 305d, respectively, and providing the deflected light beams to the right eye 401R of the user as display images.

Light beams emitted by the light beam emitting units 304a and 304c are two-dimensionally deflected by the MEMS mirrors 305a and 305c, and the deflected light beams are provided to the retina (not shown) of the left eye 401L via the optical system 402L as display images. Likewise, light beams emitted by the light beam emitting units 304b and 304d are two-dimensionally deflected by the MEMS mirrors 305b and 305d, and the deflected light beams are provided to the retina (not shown) of the right eye 401R via the optical system 402R as display images.

As a result, a stereoscopic display using disparity images formed by tiling can be achieved, as shown in FIGS. 10A and 10B. At this time, when the display images 309a and 309c, and 309b and 309d have overlap parts in association with their neighboring boundary areas, a natural display image free from any discontinuity at the boundary parts between neighboring display images can be generated.

Each of the optical systems 402R and 402L is not limited to a single optical element, and may include a plurality of optical elements. Furthermore, in FIG. 9, the optical systems 402R and 402L are configured in correspondence with systems for the right and left eyes. Alternatively, optical systems 402a to 402d may be configured in correspondence with the individual MEMS mirrors 305a to 305d.

As described above, according to this embodiment, upon making an image display using a plurality of MEMS mirrors, a problem caused by the resonance frequency difference between the MEMS mirrors generated due to variations of the resonance characteristics at the time of manufacture and different driving states can be solved as in the first embodiment. Since the plurality of MEMS mirrors can be operated by matching their driving frequency, an image free from any refresh rate difference can be displayed.

Furthermore, a large image display formed by tiling and a stereoscopic display using disparity images formed by tiling can be made, and can be presented to the user. In the system of this embodiment, even when the number of MEMS mirrors to be used increases, since the same control method can be applied, a tiling display and tiling stereoscopic display using more MEMS mirrors can be made.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-066737 filed Mar. 14, 2008, which is hereby incorporated by reference herein in its entirety.

What is claimed is:

1. An image display apparatus which has a plurality of sets each including
   an emitting unit which emits a light beam based on image information and a set operating frequency, and
   a deflection unit which deflects the light beam emitted by the emitting unit by a deflection operation based on the operating frequency, and presents the deflected light beam as an image to a user, the apparatus comprising:
   a detection unit which detects resonance frequencies of the deflection units in the respective sets; and
   a control unit which executes control for setting the operating frequency in the respective sets based on the respective resonance frequencies detected by the detection unit.

2. The apparatus according to claim 1, wherein the plurality of sets include a set for a left eye of the user and a set for a right eye of the user,
   the detection unit detects the resonance frequencies of the deflection unit included in the set for the right eye and the deflection unit included in the set for the left eye, and
   the control unit comprises:
   when a difference between the resonance frequencies detected by the detection unit falls within a prescribed value range,
   a first control unit which sets the same operating frequency in the emitting unit included in the set for the right eye and the emitting unit included in the set for the right eye; and
   when the difference falls outside the prescribed value range,
   a second control unit which updates image information used by the emitting unit included in at least one set to image information indicating an image in which the number of lines is reduced, based on the respective resonance frequencies of the deflection unit included in the set for the right eye and the deflection unit included in the set for the left eye, and sets independent operating frequencies in the emitting unit included in the set for the right eye and the emitting unit included in the set for the left eye based on the respective resonance frequencies.

3. The apparatus according to claim 2, wherein when the difference between the resonance frequencies detected by the detection unit falls within the prescribed value range,
   the first control unit determines an operating frequency f for the emitting unit included in the set for the right eye and the emitting unit included in the set for the left eye, by using the resonance frequency of the deflection unit included in the set for the right eye and the resonance frequency of the deflection unit included in the set for the left eye, and
   the deflection unit included in the set for the right eye and the deflection unit included in the set for the left eye perform horizontal deflection operations based on the operating frequency f, and then perform vertical deflection operations based on an operating frequency g according to the number of lines of the image information.

4. The apparatus according to claim 3, wherein the first control unit determines, as the operating frequency f, an average value of the resonance frequency of the deflection unit included in the set for the right eye and the resonance frequency of the deflection unit included in the set for the left eye.

5. The apparatus according to claim 2, wherein when the difference between the resonance frequencies detected by the detection unit falls outside the prescribed value range, letting fR be the resonance frequency, detected by the detection unit, of the deflection unit included in the set for the right eye, fL be the resonance frequency, detected by the detection unit, of the deflection unit included in the set for the left eye, LR be the number of lines of an image indicated by image information used by the emitting unit included in the set for the right eye, and LL be the number of lines of an image indicated by image information used by the emitting unit included in the set for the left eye, the second control unit determines LL and LR based on:

fL:fR=LL:LR.

6. The apparatus according to claim 2, wherein the detection unit detects horizontal resonance frequencies of the deflection unit included in the set for the right eye and the deflection unit included in the set for the left eye.

7. The apparatus according to claim 2, wherein when the user wears a head mounted display on a head, the image display apparatus is arranged in the head mounted display so as to present an image deflected by the deflection unit included in the set for the right eye to the right eye of the user, and to present an image deflected by the deflection unit included in the set for the left eye to the left eye of the user.

8. The apparatus according to claim 1, wherein the plurality of sets of the emitting units and the deflection units form a single image by arranging display images formed by the plurality of sets.

9. The apparatus according to claim 1, wherein the control unit executes control for setting, in the respective sets, an average value of the resonance frequencies of the deflection units in the respective sets.

10. The apparatus according to claim 1, wherein the control unit executes control for setting, in the respective sets, a resonance frequency between a maximum resonance frequency and a minimum resonance frequency of the resonance frequencies of the deflection units in the respective sets.

11. The apparatus according to claim 1, wherein the deflection unit comprises a MEMS mirror, and operates to be deflectable in a horizontal direction and a vertical direction.

12. An image display method executed by an image display apparatus which has a plurality of sets each including an emitting unit which emits a light beam based on image information and a set operating frequency, and a deflection unit which deflects the light beam emitted by the emitting unit by a deflection operation based on the operating frequency, and presents the deflected light beam as an image to a user, the method comprising:

a detection step of detecting resonance frequencies of the deflection units in the respective sets; and a control step of executing control for setting the operating frequency in the respective sets based on the respective resonance frequencies detected in the detection step.

* * * * *